(12) United States Patent
Kamali et al.

(10) Patent No.: US 10,556,211 B2
(45) Date of Patent: Feb. 11, 2020

(54) METHOD FOR PRODUCING SYNTHETIC DIAMONDS

(71) Applicant: Northeastern University, Shenyang, Liaoning Province (CN)

(72) Inventors: Ali Reza Kamali, Cambridge (GB); Derek John Fray, Cambridge (GB)

(73) Assignee: NORTHEASTERN UNIVERSITY, Shenyang (CN)

( * ) Notice: Subject to any disclaimer, the term of this patent is extended or adjusted under 35 U.S.C. 154(b) by 227 days.

(21) Appl. No.: 15/316,173

(22) PCT Filed: May 29, 2015

(86) PCT No.: PCT/GB2015/051578
§ 371 (c)(1),
(2) Date: Dec. 4, 2016

(87) PCT Pub. No.: WO2015/185898
PCT Pub. Date: Dec. 10, 2015

(65) Prior Publication Data
US 2017/0166450 A1    Jun. 15, 2017

(30) Foreign Application Priority Data

Jun. 4, 2014 (GB) .................................. 1409895.8

(51) Int. Cl.
*B01J 3/06* (2006.01)
*B82Y 40/00* (2011.01)
(Continued)

(52) U.S. Cl.
CPC .............. *B01J 3/062* (2013.01); *B82Y 30/00* (2013.01); *B82Y 40/00* (2013.01); *C01B 32/15* (2017.08);
(Continued)

(58) Field of Classification Search
CPC combination set(s) only.
See application file for complete search history.

(56) References Cited

U.S. PATENT DOCUMENTS

| | | | | |
|---|---|---|---|---|
| 4,085,196 A | * | 4/1978 | Farafontov | B01J 3/062 423/446 |
| 2009/0060772 A1 | * | 3/2009 | Kobayashi | B22F 1/025 419/11 |
| 2011/0198313 A1 | * | 8/2011 | Baraton | C23C 16/0281 216/13 |

FOREIGN PATENT DOCUMENTS

| | | |
|---|---|---|
| CN | 101049929 A | 10/2007 |
| DE | 1667532 | 7/1971 |

(Continued)

OTHER PUBLICATIONS

Huang et al, "Electrochemical Production of Sn-Filled Carbon Nanotubes in Molten Salts," Trans. Nonferrous Met. Soc. China, vol. 14, No. 3, Jun. 2004, pp. 441-445.*

(Continued)

*Primary Examiner* — Salil Jain
(74) *Attorney, Agent, or Firm* — Muncy, Geissler, Olds & Lowe, P.C.

(57) ABSTRACT

A method of producing diamonds comprises the steps of producing a carbonaceous powder comprising nano-structured carbonaceous material and a transition metal and thermally treating the powder. The carbonaceous powder is produced by electrochemical erosion of graphite in a molten salt, the transition metal being incorporated into the carbonaceous powder during the electrochemical erosion. The step of thermally treating the carbonaceous powder is carried out in a non-oxidising atmosphere at a temperature of between 350° C. and 300° C., at a pressure of lower than 1

(Continued)

GPa. The method allows diamond to be produced at low pressures and low temperatures.

16 Claims, 5 Drawing Sheets

(51) Int. Cl.
  *B82Y 30/00* (2011.01)
  *C01B 32/22* (2017.01)
  *C01B 32/15* (2017.01)
  *C01B 32/25* (2017.01)
  *C01B 32/166* (2017.01)

(52) U.S. Cl.
  CPC ............ *C01B 32/166* (2017.08); *C01B 32/22* (2017.08); *C01B 32/25* (2017.08)

(56) References Cited

FOREIGN PATENT DOCUMENTS

| | | |
|---|---|---|
| KR | 20080109492 A | 12/2008 |
| RU | 2102317 C1 | 1/1998 |
| WO | 2014/086889 A1 | 6/2014 |

OTHER PUBLICATIONS

Sun L T et al, "Nanocrystalline Diamond from Carbon Nanotubes," Applied Physics Letters, vol. 84, No. 15, Apr. 12, 2004, pp. 2901-2903.*

Chen et al, "Recent Development in Electrolytic Formation of Carbon Nanotubes in Molten Salts," Journal of Mining and Metallurgy, 39 (1-2) B (2003) 309-342 (Year: 2003).*

Hsu et al, Electrochemical Production of Low-melting Metal Nanowires, Chemical Physics Letters 301 (1999) 159-166 (Year: 1999).*

Nickitas-Etienne, Athina; PCT/GB2015/051578; International Preliminary Report on Patentability; International Bureau; dated Dec. 15, 2016.

Wen, Bin et al.; "N-Diamond from Catalysed Carbon Nanotubes: Synthesis and Crystal Structure", J. Mater. Res., 2005, pp. L513-L519, vol. 20, Institute of Physics Publishing, Printed in UK.

Wen, Bin et al.; "Transformation Mechanism from Carbon Nanotubes to N-Diamond", Journal of Physics: Condensed Matter, Jun. 2005, pp. 1485-1489, vol. 20, No. 6, Materials Research Society.

Kamali, Ali Reza et al.; "Correlation Between Microstructure and Thermokinetic Characteristics of Electrolytic Carbon Nanomaterials", Corrosion Science 64, 2012, pp. 90-97.

Kamali, Ali Reza et al.; "On the Oxidation of Electrolytic Carbon Nanomaterials", Corrosion Science 54, 2012, pp. 307-313.

Hall, Dr. Matthew; GB Search Report; GB1409895.8; dated Nov. 28, 2014.

Lekahena, Clifford; PCT/GB2015/051578; International Search Report and Written Opinion; ISA/EP; dated Sep. 8, 2015.

Sun, L.T.; "Nanocrystalline Diamond from Carbon Nanotubes"; Applied Physics Letters; American Institute of Physics; Apr. 12, 2004; pp. 2901-2903;vol. 84; No. 15.

Carsten, Schwandt et al.; "High-yield Synthesis of Multi-Walled Carbon Nanotubes from Graphite by Molten Salt"; Elsevier Ltd.; Oct. 31, 2011; pp. 1311; vol. 50; No. 3.

Anagappan, S.; "Synthesis of Carbon Nanotubes by Molten Salt Techniques"; Chemical Science Transactions; Apr. 18, 2013; pp. 575-583; vol. 2; No. 2.

Das Gupta, Rajshekar et al.; "Preparation of tin-filled carbon nanotubes and nanoparticles by molten salt electrolysis"; Carbon; Jan. 7, 2014; pp. 142-148; vol. 70.

* cited by examiner

METHOD FOR PRODUCING SYNTHETIC DIAMONDS

The present invention relates to a method of producing diamonds from a graphite starting material. The graphite is eroded electrochemically in a molten salt to produce a carbonaceous powder, and this carbonaceous powder is thermally treated in a non-oxidising atmosphere to produce synthetic diamonds.

BACKGROUND

Diamond is one of the best characterised allotropes of carbon. It possesses a unique combination of materials properties including the highest known hardness, excellent thermal conductivity, high chemical inertness, good biocompatibility, and a wide optical transmission range. Owing to its extreme hardness, diamond is widely applied in tools as cutting and wear-resistant material. Diamond is also used as an anti-erosion agent in the oil and other industries, as a polishing material in the optics and electronics sector, and has been proposed as a lubricant in vacuum tribology.

Other applications of diamond include its use as a transmission window for lasers, sensing and imaging and heat-spreaders for optoelectronic and semiconductor devices, in electrochemical devices such as electrical double layer capacitors, in micro-electromechanical systems (MEMS), as a medical implant material, as a carrier component in drug delivery systems, and in the nuclear field.

Diamond can also be applied to improve the properties of advanced composites, due to its high hardness and thermal conductivity and/or its low thermal expansion coefficient. For example, the incorporation of nanodiamond powder into organic polymers such as polyvinyl alcohol, polylactide and epoxy leads to improved mechanical properties and thermal conductivity in the composites. Moreover, composites of diamond/Al, diamond/SiC/Al, diamond/Cu, diamond/carbon nanotube and diamond/pyrocarbon are useful in applications such as field emission devices, electronic packaging and heat sinks.

The transformation of graphite into diamond is of great interest to academia and industry and has been the subject of numerous studies for many decades. The phase diagram of carbon shows that diamond is the thermodynamically stable allotrope of carbon at pressures in excess of several GPa over a wide temperature range. However, diamond may also exist as a metastable phase at ambient pressure.

It is possible to convert graphite directly into diamond, but this requires extreme pressures and temperatures to overcome the large activation energy that is necessary for the breaking of the $sp^2$-bonds in the graphite structure and the formation of new $sp^3$-bonds in the diamond structure. The direct transformation of $sp^2$-graphite to $sp^3$-diamond is known to take place at high temperatures and pressures of about 3000° C. and 12 GPa, respectively.

In the 1950s, it was discovered that molten transition metals such as Fe, Co, Ni and their alloys are able to dissolve carbon and then precipitate diamond under the conditions of high pressure and high temperature (HPHT) in its thermodynamically stable region. Typical pressures required are 5 to 6 GPa at temperatures of at least 1300° C. In this process, the metallic medium acts as a solvent-catalyst that reduces the activation energy, and thereby the pressure-temperature conditions, for the graphite-to-diamond transition.

Diamond may be produced at low pressures by means of a chemical vapour deposition (CVD) process. CVD processes deposit diamonds on a substrate using a heated mixture of carbon-containing gas and hydrogen. Gem quality synthetic diamonds have been produced by using diamond seed crystals and a CVD process.

In the 1990s, it was demonstrated that the molten carbonates of Li, Na, K, Cs, Mg, Ca and Sr are also able to act as a solvent-catalyst for diamond formation from graphite at typical HPHT conditions of 5 to 8 GPa and 1600 to 2150° C. Subsequently, several other inorganic melts, including alkali metal halides such as LiCl and mixed systems comprising more than one component, have been used successfully under similar experimental conditions. In all cases, applying HPHT conditions has been considered as a critical prerequisite for the successful transformation.

Theoretical analyses have shown that the $sp^3$-diamond nucleation from $sp^2$-carbon may be more preferable inside a carbon nanotube (CNT) or carbon nanoparticle. This is due to the effect of surface tension induced by the nano-meter sized curvature of such carbon nanomaterials, in comparison with the direct nucleation of diamond from graphite. Many attempts, therefore, have been made to transform chemical vapour deposition (CVD) synthesised CNTs into diamond, mostly using relatively high temperature and/or high pressure techniques such as laser irradiation, shock wave processing, spark plasma sintering, and radio-frequency hydrogen plasma processing. Such methods of transforming CNTs into diamond require complicated and expensive equipment, such as high energy electron/particle beams, spark plasma sintering or a HPHT facility. This reduces the significance of advantages associated with the utilization of CNTs for the synthesis of diamond.

SUMMARY OF INVENTION

The present invention provides a method of producing diamonds as defined in the appended independent claim, to which reference should now be made. Preferred or advantageous features of the invention are set out in various dependent sub-claims.

Thus, a method of producing diamonds may comprise the steps of producing a carbonaceous powder comprising nano-structured carbonaceous material and a transition metal by electrochemical erosion of graphite in a molten salt, and thermally treating the carbonaceous powder in a non-oxidising atmosphere. The transition metal is incorporated into the carbonaceous powder during the electrochemical erosion process. The step of thermally treating the powder is carried out at a temperature of between 350° C. and 1300° C., and at a pressure of lower than 1 GPa.

The equipment required for this method is relatively simple. Electrolysis cells are well known and simple to operate, and a standard furnace can be used to carry out the thermal treatment. In preferred embodiments the pressure during thermal treatment is ambient atmospheric pressure, so the furnace does not need to be capable of withstanding high pressures.

The nano-structured carbonaceous material produced by the electrochemical erosion may be described as electrochemically-produced carbon material (EPC). In contrast to the CVD-synthesised CNTs referred to above, EPC material is a type of carbon which is synthesized by a molten salt electrolytic method. In a preferred method, a bulk graphite sample is cathodically polarized in a molten alkali metal chloride salt (particularly lithium chloride), such that the alkali metal ion discharges and the alkali metal intercalates into the graphite and disintegrates its microstructure. The graphite may continually be eroded into a variety of nano-metre sized carbon entities including multi-walled CNTs and carbon nanoparticles depending on grain size of graphite, current density and temperature. These become detached from the graphite surface and accumulate in the molten salt bath from where they can be harvested as a carbonaceous powder.

EPC possesses a unique microstructure in which inorganic materials, such as $Li_2CO_3$ and LiCl, may become trapped within their graphitic structure. Advantageously, by controlling the composition of the molten salt, it may be possible to incorporate metallic elements into the EPC structure. For example, if the molten salt contains iron and nickel species, an EPC powder formed in the molten salt may contain metallic elements such as Ni and Fe. By controlling parameters such as the composition of the salt and the duration of the erosion process, it may be possible to produce a carbonaceous powder with a predetermined proportion of metallic phase. The metallic phase may be an element or an alloy or an intermetallic. By controlling the proportion of different metallic elements in the molten salt, it may be possible to control the composition of an alloy formed in the carbonaceous powder.

The diamonds produced are preferably diamond crystals having a diameter of between 10 nanometres and 10 micrometres, for example between 200 nanometres and 1 micrometre. The diamonds may have a diameter of between 0.05 micrometres and 5 micrometres, or 0.05 micrometres and 1 micrometre, or 0.05 micrometres and 0.5 micrometres. The diamonds produced may have a diameter of the order of 15 micrometres or 20 micrometres, or 25 micrometres. Diamonds may be formed having a diameter extending to more than 100 micrometres.

The term "nano-structured carbonaceous material" relates to material in the form of one or more carbon-based nanostructures. The material may be, for example, in the form of a powder comprising one or more carbon-based nanostructures such as nano-particles, nano-tubes, nano-scrolls, nano-filaments, and nano-onions. Structures such as nano-particles, nano-tubes, and nano-scrolls may be single-walled or multi-walled. Nano-structured carbonaceous material may relate to any fullerene-based carbon particles. Nano-structured carbonaceous material may relate to any nano-scale graphene-based particles.

The physical size of individual elements of a nano-structured carbon material will be understood by those in the art. For example, nano-tubes typically have a diameter of between 2 nm and 100 nm. The length of these structures may be many hundreds or thousands of times the diameter. For example, despite their nanoscale diameter, individual nano-tubes may have lengths exceeding 1 micrometre, or greater than 10 micrometres. The diamonds may form by a process of initiation, or nucleation, followed by growth. The ultimate size of the diamonds may be controlled by controlling initiation and growth parameters.

Nano-structured carbonaceous material may frequently be in the form of a three-dimensional structure formed from single layers of carbon atoms (graphene). Thus, the graphene layer may define the shape of the nano-structure, and the internal portion of the nano-structure may be a void. Thus, nano-tubes and nano-scrolls are hollow structures formed by one or more graphene layers. The skilled person will be aware of various carbon species that may form part of a nano-structured carbonaceous material.

Graphene consists of interconnected hexagons of carbon atoms which are bonded to each other via $sp^2$ bonds, whilst diamond is a three-dimensional network of $sp^3$-hybridized carbon atoms. Although nano-structured carbonaceous material is mainly made of $sp^2$-bonded carbon atoms, the out-of-plane curvature of carbon sheets, as well as pentagon-heptagon pair defects present in this material, result in partial $sp^3$ hybridization. Therefore, it may be the case that nano-structured carbon material such as carbon nanotubes and particles comprises a relatively high proportion of $sp^3$ bonds in addition to the normal $sp^2$ bonds of graphite. It is known that the intercalation of lithium into graphite encourages the formation of $sp^3$ bonds.

In the carbonaceous powder formed by electrochemical erosion of graphite, the nano-structured carbonaceous material component of the powder is in contact with a suitable transition metal. Preferably the transition metal is an element, alloy, or intermetallic having a face-centred-cubic (FCC) crystal structure at the temperature at which the carbonaceous powder is thermally treated. Thus, the transition metal may be an element such as iron, or an alloy, such as Fe-10 at % Ni, or an intermetallic such as FeNi.

The transition metal may preferably be formed on, or deposited onto, surfaces of the nano-structured carbonaceous material. It may be particularly preferred that at least a portion of transition metal is disposed within the nano-structured carbonaceous material. For examples, carbon nano-structured species such as nano-tubes and nano-scrolls have an internal cavity. It may be advantageous for a portion of transition metal to be disposed within the internal cavity of a nano-structured carbonaceous species, for example in contact with an internal wall of a nano-structured carbonaceous species.

The transition metal may be preferably in the form of nano-spots or nano-particles of metal. For example, a transition metal disposed in contact with an inner surface of a carbon nano-tube may preferably have a diameter of between 1 and 10 nanometres and a volume of between 1 $nm^3$ and 100 $nm^3$.

It is preferred that the transition metal is, or is an alloy or intermetallic comprising, an element selected from the list consisting of iron, nickel, manganese, cobalt and chromium. Iron-nickel alloys or iron-manganese alloys may be preferred.

It is not desirable for the carbonaceous powder to comprise a large proportion of the transition metal. It may be preferable that the carbonaceous powder comprises less than 5 wt % of the transition metal, for example less than 3 wt %, or less than 2.5 wt %.

Advantageously, the carbonaceous powder may comprise carbon nanoparticles, carbon nanotubes and/or carbon nano-scrolls, and at least a portion of the transition metal is disposed within internal cavities of the nano-particles, nano-tubes and/or nano-scrolls.

The carbonaceous powder is formed by electrochemical erosion of graphite in a molten salt. Preferably the molten salt is a lithium bearing salt or a sodium bearing salt. It may be particularly preferred that carbonaceous powder is formed at a temperature of between 650° C. and 1200° C., and that the nano-structured carbonaceous material forming the powder is created by the intercalation of lithium or sodium into graphite. It may also be preferred to create the carbonaceous material using geometric cathodic densities between 0.4 and 3 A $cm^{-2}$. Selection of the graphite grain size and control of the temperature of formation and the cathodic densities may allow an operator of the process to control the proportion and dimensions of different nano-structures within the nano-structured carbonaceous material.

Preferably the molten salt comprises a proportion of the transition metal to be formed as part of the carbonaceous powder. Thus, the transition metal may be formed or deposited on, or within, the nanostructured carbonaceous material as it forms. Preferably, the molten salt is an alkali metal chloride molten salt comprising a proportion of the transition metal, for example an alkali metal salt comprising the transition metal chloride.

The method may comprise the step of adding one or more transition metal chloride to the molten salt prior to, or during, the electrochemical erosion step. The metallic species of the one or more transition metal chloride may be reduced to metal to provide at least a portion of the transition metal incorporated into the carbonaceous powder during the electrochemical erosion step. Preferably the one or more transition metal chloride is an iron chloride and/or a nickel chloride.

Alternatively, or in addition, one or more solid piece of transition metal may be arranged in contact with the molten salt prior to, or during, the electrochemical erosion step. Chlorine may be present in the cell, and this chlorine may chlorinate the transition metal. The harsh environment of the electrolysis cell may, therefore, cause a portion of the or each solid piece of transition metal to dissolve into the molten salt as a chloride. The dissolved transition metal may provide at least a portion of the transition metal incorporated into the carbonaceous powder during the electrochemical erosion step. It is preferable that the one or more solid piece of transition metal comprises iron and/or nickel. For example, a rod of stainless steel may be arranged in contact with the molten salt to form an iron-nickel alloy in the carbonaceous powder.

The transition metal incorporated into the carbonaceous powder during the electrochemical erosion is preferably an iron-nickel alloy.

The process of electrochemical erosion of graphite may advantageously increase the proportion of $sp^3$ bonds in the resulting nanostructures in comparison with nanostructures produced by other means. For example, an alkali metal such as lithium may act as a catalyst for conversion of $sp^2$ bonds to $sp^a$ bonds, and the intercalation of lithium into a graphite structure may, thus, form nano-structures that have a relatively high proportion of $sp^3$ bonds. As stated above, $sp^3$ bonds may promote nucleation and subsequent growth of diamonds during thermal treatment.

The step of thermally treating the carbonaceous powder is preferably carried out at a pressure lower than 1000 kPa. The use of a low pressure for the thermal treatment advantageously removes the need for the thermal treatment to be carried out using expensive equipment designed to operate at high pressures. While thermal treatment may be carried out at high pressure there is no benefit in doing so, and it is particularly preferable that the thermal treatment is carried out at a pressure lower than 200 kPa, for example at about 100 kPa.

It may be particularly advantageous that the carbonaceous material is thermally treated at ambient pressure, for example under atmospheric pressure. Thus, there is no need for the method to be carried out in a pressurised apparatus.

The non-oxidising atmosphere is preferably a reducing atmosphere, for example an atmosphere comprising hydrogen gas. A reducing atmosphere protects the carbonaceous powder from combustion and allows the powder to be maintained at a high temperature for a longer period of time. The reducing atmosphere also helps protect any diamonds that for from being combusted. A suitable reducing atmosphere may comprise 75-90 vol % nitrogen and 10-25 vol % hydrogen, preferably about 85 vol % nitrogen and about 15 vol % hydrogen.

Thermal treatment of the carbonaceous powder preferably takes the form of heating the carbonaceous powder, or the environment surrounding the carbonaceous powder, to a predetermined treatment temperature, holding at this temperature, and then cooling the material to ambient temperature.

Heating may be carried out by ramping the temperature to a desired maximum temperature. For example carbonaceous powder may be heated, for example, to a target temperature of between 500 and 800° C. at a rate of between 1 and 150° C. per minute. Preferred heating rates may be between 50° C. or 60° C. per minute and 120° C. per minute, for example between 80° C. per minute and 100° C. per minute, or about 80° C. per minute. The preferred heating rates may be lower, particularly where large thermal masses are involved. For example, heating rates may be between 5° C. and 50° C., for example between 10° C. and 25° C.

Once the carbonaceous powder has reached the target temperature it may be cooled immediately. Alternatively, the carbonaceous powder may be held at a predetermined temperature for a period of time while diamonds nucleate and grow before being cooled.

It may be difficult to determine the precise temperature of the carbonaceous powder during thermal treatment. Thus, the carbonaceous powder may be held in an environment maintained at a desired thermal treatment temperature.

The carbonaceous powder may be heated by placing the material into an environment that has been pre-heated to a predetermined temperature, for example a temperature of between 350 and 1300° C., for example between 500 and 800° C. Thus, the thermal treatment may occur without ramping the temperature.

The carbonaceous powder may be held at the maximum desired thermal treatment temperature for a period of greater than ten minutes, for example for thirty minutes, or more. A longer treatment may increase the size of the diamonds that are produced because more time is provided for growth. Alternatively, if small diamonds are desired, the treatment time may be less than ten minutes.

Cooling may occur by quenching in a stream of gas. Preferably the cooling rate is greater than 25° C., for example greater than 100° C. per minute, or greater than 500° C. per minute. It is noted that cooling need not be linear with time and the actual cooling rate may vary during cooling.

The carbonaceous powder may further comprise nanoscale particles of an alkali metal carbonate, for example lithium carbonate or sodium carbonate. Such alkali metal carbonates may provide further catalytic effect in promoting the formation of diamonds.

SPECIFIC EMBODIMENTS

Specific embodiments exemplifying the invention will be described below with reference to the appended figures, in which.

ELECTROCHEMICALLY-PRODUCED CARBON (EPC) POWDER

The following describes production of a carbonaceous powder, which may be termed an EPC powder, to be thermally treated to produce diamonds.

Figure 1:
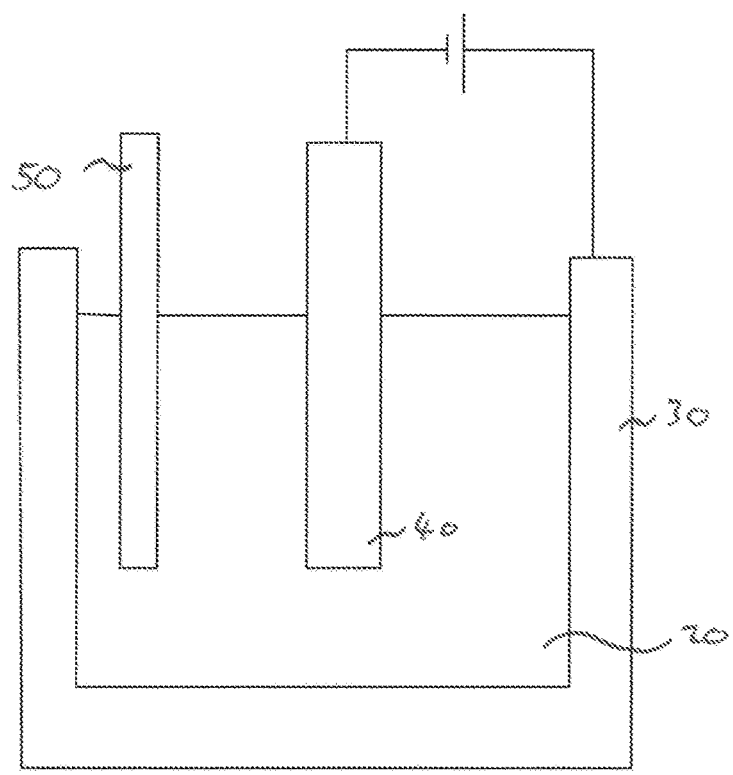
FIG. 1 is a schematic illustration of an electrolysis cell for production of Electrochemically-produced carbon (EPC) powder.

With reference to FIG. 1, approximately 250 g of anhydrous LiCl (213233, Sigma-Aldrich) was placed in a graphite crucible 30 of inner diameter 55 mm and height 130 mm. This was heated to a target temperature of 650-1200° C. under an atmosphere of argon. The argon was dried prior to use by passing it over self-indicating $CaSO_4$.

Electrolysis of the molten LiCl 20 was performed with a graphite rod 40 serving as the cathode and the graphite crucible 30 serving as the anode. The cathode rod 40 had a diameter of 15 mm. Electrolysis was performed with a constant current of 33 A, corresponding to an initial geometric current density at the cathode of about 1.0 A $cm^{-2}$, and for the duration of 60 min. A stainless steel rod 50 was arranged in contact with the molten salt 20 during the electrolysis.

Without wanting to be bound to theory, it is assumed that during the molten salt electrolysis with graphite electrodes, there is an excessive accumulation of lithium species into the spaces between the graphene layers of the graphite structure, which exerts mechanical stress onto the graphite matrix, causing its erosion and the expellation of nanostructured carbon constituents from the graphite cathode into the molten salt. It may be the case that a fraction of carbon atoms in EPC form $sp^3$ bond due to the curvature and defects of nanostructured carbon material. It may be that $sp^3$ content of EPC is promoted by the intercalation of lithium species taking place during the molten salt electrolysis process. The presence of $sp^a$ bonds may positively influence the nucleation and growth of diamond during subsequent thermal treatment of the nano-structured carbon material.

The stainless steel rod was heavily corroded during the electrolysis and this corrosion resulted in iron and nickel species being incorporated into the molten salt. During the electrolysis, a proportion of these iron and nickel species were reduced at the graphite electrodes, causing the incorporation of a transition metal alloy (Fe—Ni alloy) into the EPC powder. As an alternative, iron and nickel chlorides may be introduced into the molten salt to supply the iron and nickel phases. As a further alternative, a transition metal alloy (for example a Fe—Ni alloy) rod or plate may be attached to the graphite anode. In this case, the alloy is dissolved into the molten salt upon anodic polarization during the electrolysis process, and may be incorporated into the EPC powder.

After electrolysis the cell was cooled to room temperature. The EPC powder produced by the electrolysis was recovered and rinsed with copious amounts of distilled water in order to remove lithium chloride, and the resulting suspension was then vacuum-filtered to separate the carbon product. The latter was collected and dried at 100° C. in a vacuum of 0.1 mbar for 6 h.

A Philips 1710 high resolution X-ray diffractometer (XRD) with Cu anode was used for phase analysis of the carbon materials occurring at the various stages of the experiments. A JEOL 6340F field emission scanning electron microscope (SEM) was used for microstructural investigations.

Figure 2:
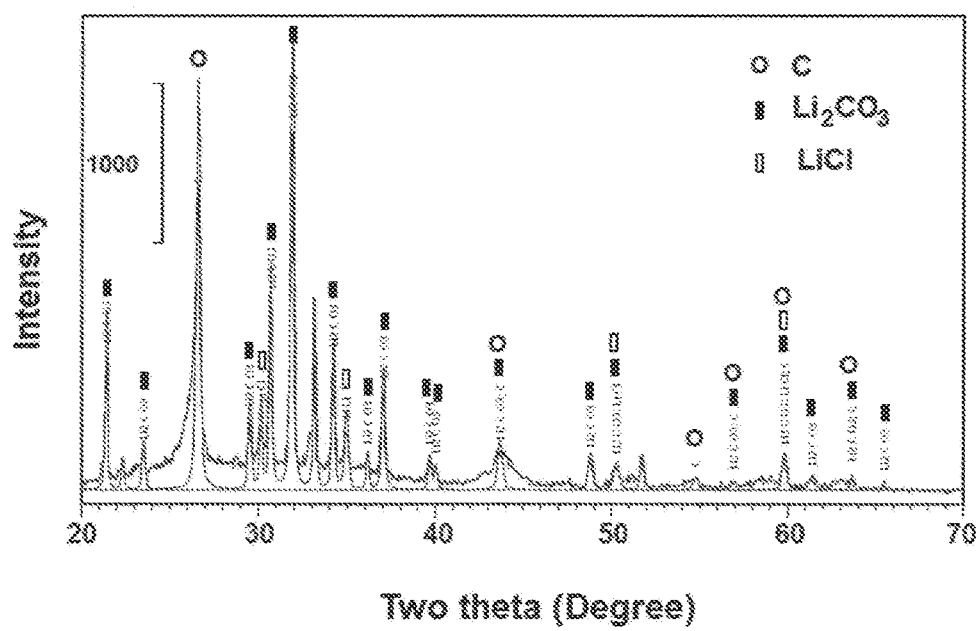
FIG. 2 is an XRD pattern of an EPC powder produced using the electrolysis cell of FIG. 1.

FIG. 2 shows the X-ray diffraction pattern of the EPC powder sample recovered after electrolysis. The diffraction pattern can be indexed to the diffraction peaks of C, $Li_2CO_3$ and LiCl.

Figure 3:
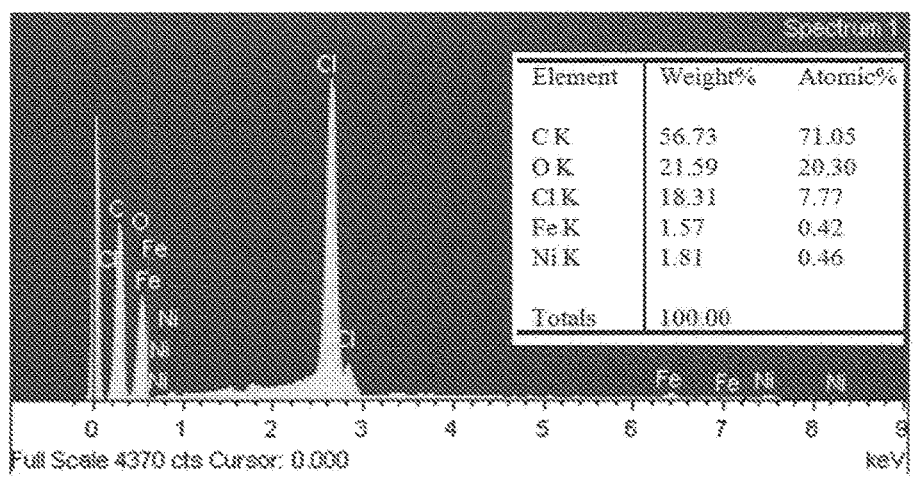
FIG. 3 illustrates an EDX analysis of the EPC powder produced using the electrolysis cell of FIG. 1.

As seen in FIG. 2, no metallic component can be detected in the XRD pattern of EPC. This shows that metallic components exist in quantities below the detection limit of XRD. However, an EDX analysis of the same sample, as illustrated in FIG. 3, indicates the presence of Fe and Ni.

The microstructure of the EPC powder was analysed by SEM and found to comprise nanotubes with diameters in the wide range of 10 to 500 nm and spherical nanoparticles with diameters of typically less than 100 nm. Some graphitic sheets were also seen.

Carbonaceous powder of this type, i.e. comprising nanostructured carbonaceous structures and a proportion of Fe and Ni, was then subjected to thermal treatment in a reducing atmosphere as described below.

Production of Diamonds by Thermal Treatment of EPC Powder

In order to activate the conversion of EPC to diamond, the EPC sample formed as described above was heat treated at atmospheric pressure in a tube furnace under a flow of 85 vol % $N_2$-15 vol % $H_2$. Heat treatments were performed at different temperatures ranging from 700° C. to 1300° C. For each separate heat treatment, 2 g of the EPC powder was heated at a heating rate of 15° C. $min^{-1}$ to the maximum temperature. Each sample was then cooled down to room temperature in the same flow of 85 vol % $N_2$-15 vol % $H_2$ by turning the furnace off.

XRD patterns were produced for each sample. The X-ray diffraction patterns of as-synthesised EPC, and each of the heat treated samples, at 2θ angles between 20° and 70°, are compared in FIG. 4.

The XRD analysis of the as-synthesised EPC powder has been discussed above. As discussed, the diffraction peaks relate to C, $Li_2CO_3$ and LiCl.

Figure 4:
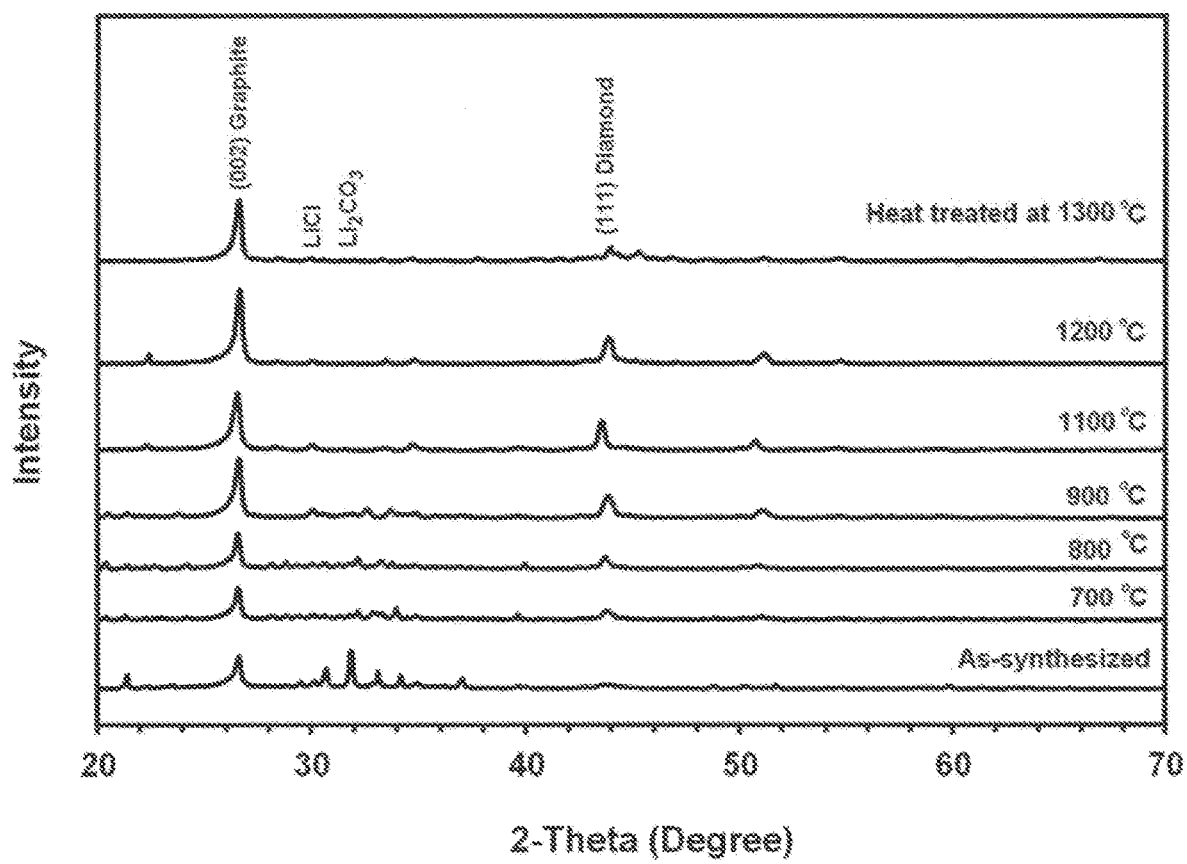
FIG. 4 illustrates XRD traces of an as-synthesised EPC powder produced using the electrolysis cell of FIG. 1 and a number of EPC powders that have been thermally treated at different temperatures in a reducing atmosphere.

As can be seen in FIG. 4, an additional diffraction peak was noted having a 2θ angle between 43 and 44 degrees in the XRD pattern of the sample heated at 700° C. This peak was also evident in the samples heated to 800° C., 900° C., 1100° C., 1200° C., and 1300° C. As depicted, the intensity of this peak increases with the increase of the heating temperature to 1100° C., and then decreases at higher temperatures. This diffraction peak can be assigned to cubic diamond (111).

Figure 5:
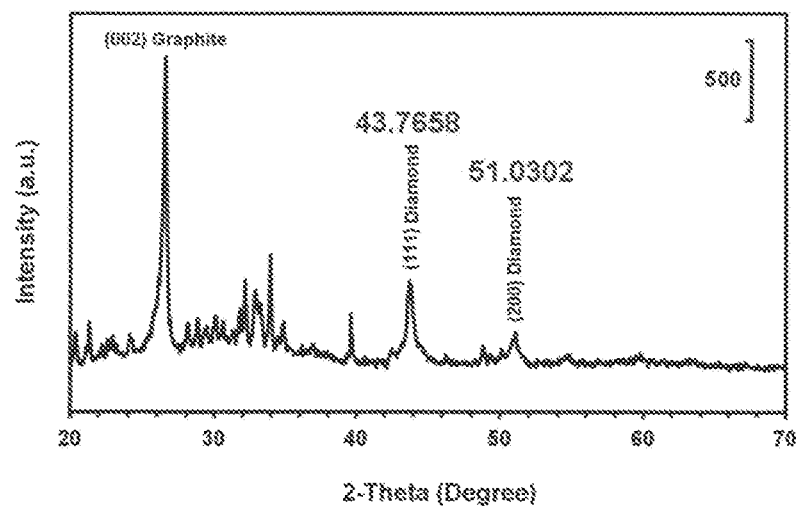
FIGS. 5 and 6 show details of an XRD trace of an EPC powder that has been thermally treated at a temperature of 700° C.
Figure 6:
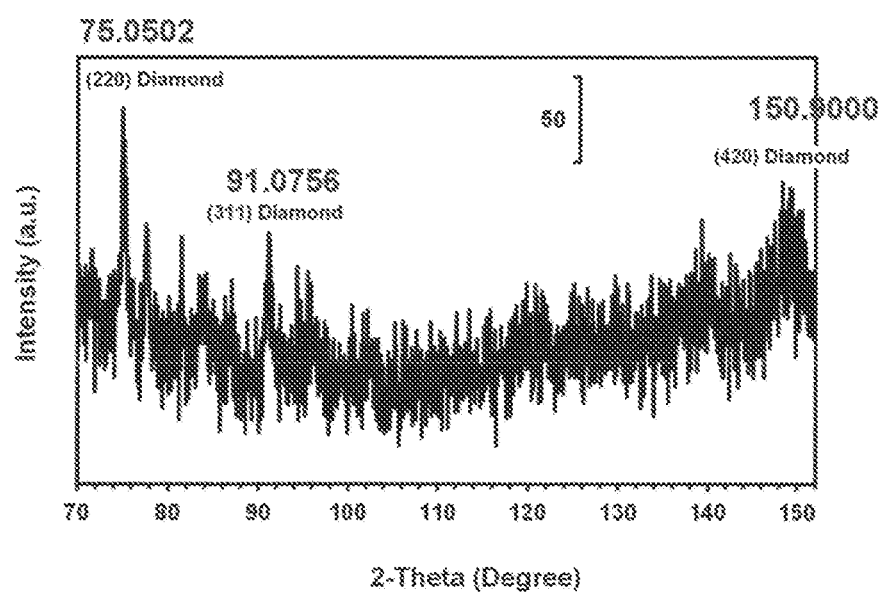

FIGS. 5 and 6 show the x-ray diffraction patterns of the EPC sample heated at 700° C. at 2θ angles 20-70 degree (FIG. 5) and 2θ70-120 degree (FIG. 6) in more detail. These XRD results demonstrate the presence of diamond diffraction peaks. These peaks can be related to the phase n-diamond (JCPDS:0431104) with a cubic structure, considering that the (002) diamond reflection is forbidden for cubic n-diamond phase.

Figure 7:
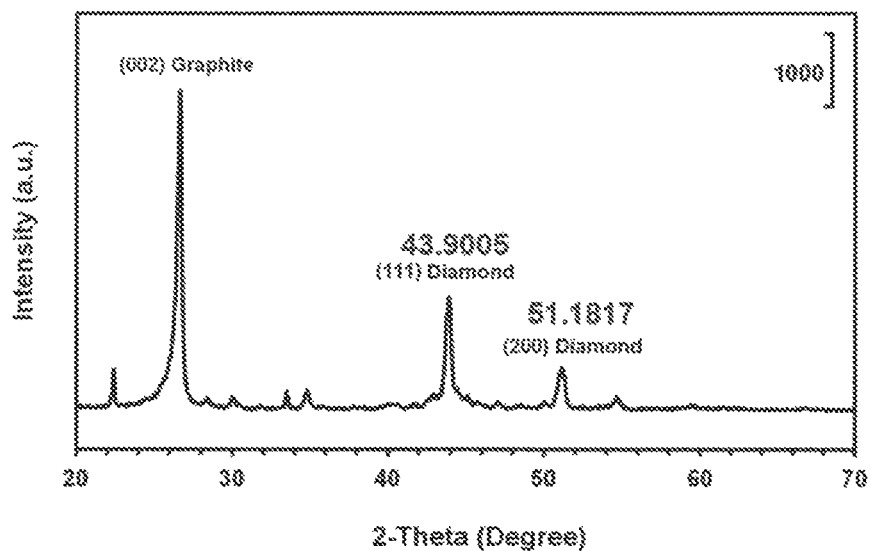
FIGS. 7 and 8 show details of an XRD trace of an EPC powder that has been thermally treated at a temperature of 1200° C.
Figure 8:
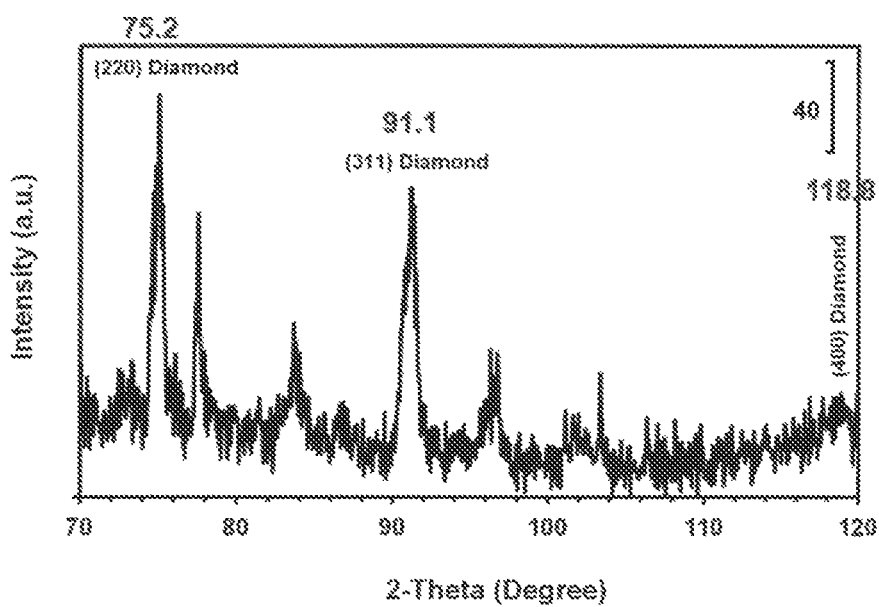

FIGS. 7 and 8 show the XRD diffraction pattern of the EPC sample heat treated at 1200° C. at 2θ angles 20-70 degree (FIG. 7) and 2θ70-120 degree (FIG. 8). This figure again demonstrates the presence of n-diamond diffraction peaks.

According to available literature, n-diamond may be a hydrogen-doped (H-doped) diamond. It is known that when the hydrogen concentration is less than 19 at. %, H-doped diamond is stable. When the hydrogen concentration is about 4 at. %, the optimized lattice and simulated XRD patterns agree well with the experimental data for n-diamond.

Figure 9:
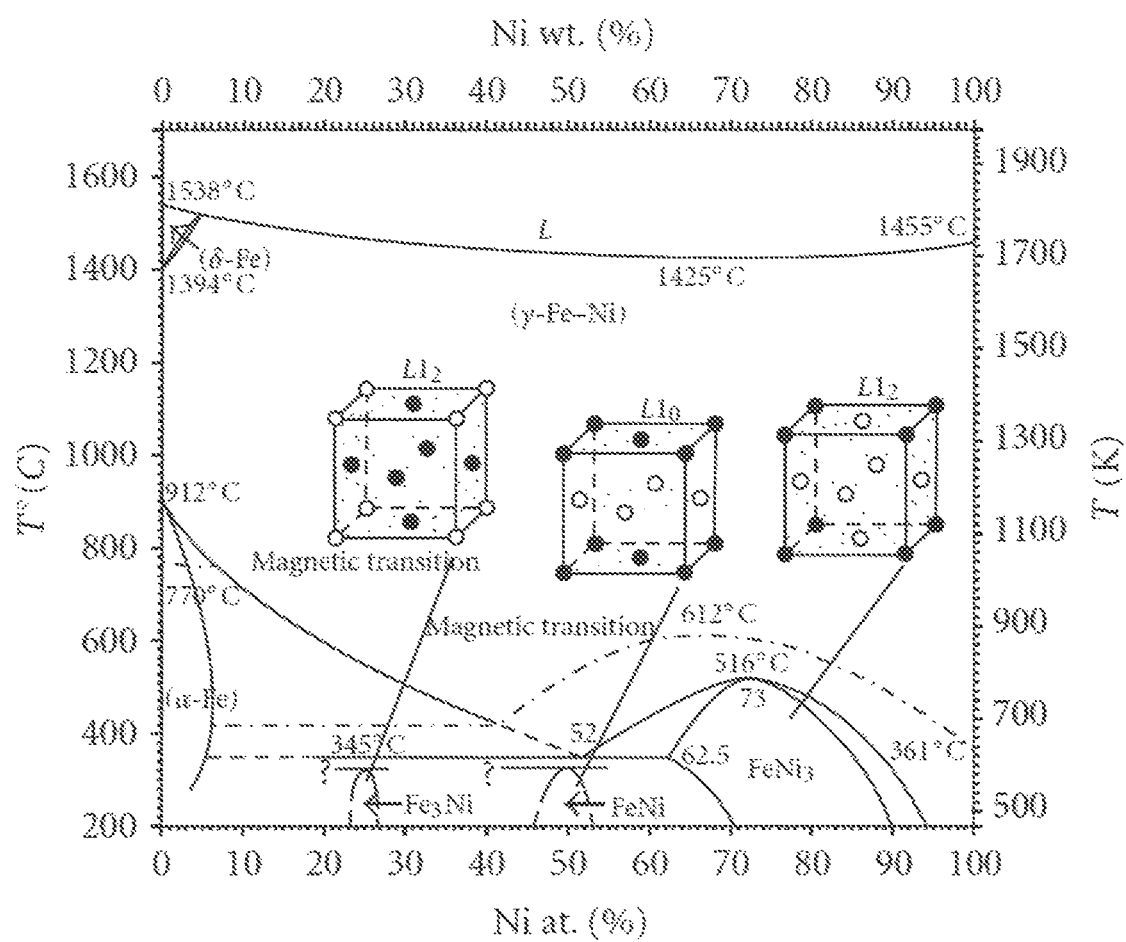
FIG. 9 illustrates a Fe—Ni phase diagram.

While not wishing to be bound by theory, the formation of diamond phases by heat-treating EPC powder at a temperature as low as 700° C. may be explained by the Fe and Ni content of the EPC powder. The elements Fe and Ni are introduced into carbon microstructure of EPC during the electrolysis process. These elements can easily form Fe—Ni solid solutions during either the molten salt electrolysis or the heat-treatment process. The phase diagram of Fe—Ni (FIG. 9) indicates that an Fe—Ni solid solution having the γ-Fe face-centred-cubic (FCC) crystalline structure can be stable at temperatures above 350° C., depending on its chemical composition. Therefore, the formation of diamond may be attributed to the catalytic action of the Fe—Ni solid solution phase, which is tightly embedded as nanoscale particles in the EPC powder.

During the heat treatment process, carbon may diffuse into the Fe—Ni solid solution. As more carbon diffuses into the solid solution, the concentration level of carbon is raised to the point that it exceeds the solubility limit of carbon in the solid solution. The oversaturated carbon may then be deposited from the FCC-structured solid solution in the form of FCC-structured diamond crystallites.

The invention claimed is:

1. A method of producing diamonds comprising the steps of,
producing a carbonaceous powder comprising nano-structured carbonaceous material and a transition metal, wherein the transition metal is an element having a face-centred-cubic (FCC) structure, alloy having a FCC structure, intermetallic having a FCC structure at the temperature at which the carbonaceous powder is thermally treated and/or, or an alloy or intermetallic comprising an element selected from the group consisting of iron, nickel, cobalt, chromium and manganese by electrochemical erosion of graphite in a molten salt, the transition metal being incorporated into the carbonaceous powder during the electrochemical erosion, and
thermally treating the carbonaceous powder in a non-oxidizing atmosphere at a temperature of between 350° C. and 1300° C., at a pressure lower than 1 GPa,
wherein the transition metal is present in the form of nanoscale particles disposed on or within the nano-structured carbonaceous material,
wherein the transition metal is present in the form of particles or deposits having maximum dimensions of between 1 and 10 nanometers.

2. A method according to claim 1 in which the nano-structured carbonaceous material comprises one or more nano-structures comprising carbon nano-particles, carbon nano-tubes or carbon nano-scrolls.

3. A method according to claim 1 in which the transition metal is less than 5 wt % of the carbonaceous powder.

4. A method according to claim 1 in which the carbonaceous powder comprises carbon nano-particles, carbon nano-tubes and/or carbon nano-scrolls, and at least a portion of the transition metal is disposed within internal cavities of the nano-particles, nano-tubes and/or nano-scrolls.

5. A method according to claim 1 in which the molten salt is a lithium-bearing salt, or a sodium-bearing salt.

6. A method according to claim 1 in which the nanostructured carbonaceous material is created by the intercalation of lithium or sodium into graphite.

7. A method according to claim 1 in which the step of thermally treating the carbonaceous powder is carried out at a pressure lower than 1000 kPa, lower than 200 kPa, or at about 100 kPa.

8. A method according to claim 1 in which the step of thermally treating the carbonaceous powder is carried out at ambient atmospheric pressure.

9. A method according to claim 1 in which the non-oxidizing atmosphere is a reducing atmosphere comprising 75-90 vol % nitrogen and 10-25 vol % hydrogen, or about 85 vol % nitrogen and about 15 vol % hydrogen.

10. A method according to claim 1 in which the non-oxidizing atmosphere is heated to a temperature of between 400° C. and 1200° C. to carry out the thermal treatment step, between 500° C. and 1100° C., or between 550° C. and 1000° C.

11. A method according to claim 1 in which the step of thermally treating the carbonaceous powder involves heating the carbonaceous powder, or the non-oxidizing atmosphere surrounding the carbonaceous powder, to a predetermined maximum temperature at a heating rate of between 1 and 150° C. min$^{-1}$, holding at the predetermined maximum temperature for a predetermined time, and then cooling.

12. A method according to claim 1 in which the carbonaceous powder further comprises nanoscale particles of an alkali metal carbonate, wherein the alkali metal carbonate comprises lithium carbonate or sodium carbonate.

13. A method according to claim 1 in which the molten salt is an alkali metal chloride molten salt comprising the transition metal.

14. A method according to claim 10, further comprising the step of adding one or more transition metal chloride to the molten salt prior to, or during, the electrochemical erosion step, the one or more transition metal chloride providing at least a portion of the transition metal incorporated into the carbonaceous powder during the electrochemical erosion step, wherein the one or more transition metal chloride is an iron chloride and/or a nickel chloride.

15. A method according to claim 1 in which one or more solid piece of transition metal is arranged in contact with the molten salt prior to, or during, the electrochemical erosion step, a portion of the one or more solid piece of transition metal dissolving into the molten salt to provide at least a portion of the transition metal incorporated into the carbonaceous powder during the electrochemical erosion step, wherein the one or more solid piece of transition metal comprises iron and/or nickel.

16. A method according to claim 1 in which the transition metal incorporated into the carbonaceous powder during the electrochemical erosion is an iron-nickel alloy.

* * * * *